United States Patent
Brown et al.

(10) Patent No.: US 7,839,989 B2
(45) Date of Patent: *Nov. 23, 2010

(54) INTERMEDIARY DEVICE BASED CALLEE IDENTIFICATION

(75) Inventors: Michael Wayne Brown, Georgetown, TX (US); Joseph Herbert McIntyre, Austin, TX (US); Michael A. Paolini, Austin, TX (US); James Mark Weaver, Austin, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1035 days.

This patent is subject to a terminal disclaimer.

(21) Appl. No.: 11/554,269

(22) Filed: Oct. 30, 2006

(65) Prior Publication Data

US 2007/0237319 A1    Oct. 11, 2007

Related U.S. Application Data

(62) Division of application No. 10/015,282, filed on Dec. 12, 2001, now Pat. No. 7,167,551.

(51) Int. Cl.
   *H04M 1/56* (2006.01)
(52) U.S. Cl. ............ 379/142.05; 370/390; 379/201.07; 709/207
(58) Field of Classification Search .......... 379/199, 379/201.07, 214.07, 88.02, 91.01, 142.05, 379/207.14, 211.02, 265.02, 265.09, 266.01; 370/310, 409, 390; 455/433; 704/275; 713/170; 709/207
See application file for complete search history.

(56) References Cited

U.S. PATENT DOCUMENTS

| 64,264 | A | 8/1901 | Lung et al. |
| 4,788,715 | A | 11/1988 | Lee |
| 4,953,204 | A | 8/1990 | Cuschleg et al. |
| 5,014,298 | A | 5/1991 | Katz |
| 5,018,191 | A | 5/1991 | Catron et al. |
| 5,020,095 | A | 5/1991 | Morganstein et al. |

(Continued)

FOREIGN PATENT DOCUMENTS

EP     0585004 A2     3/1994

(Continued)

OTHER PUBLICATIONS

WPAT 94-067503, Derwent.

(Continued)

*Primary Examiner*—Gerald Gauthier
(74) *Attorney, Agent, or Firm*—Brandon C. Kennedy; John Flynn; Biggers & Ohanian, LLP

(57) ABSTRACT

Methods, systems, and products for informing a caller of a callee identity are disclosed that include: detecting a call receipt condition from a destination device at a trusted telephone network; brokering a connection between said destination device and an external server enabled to perform a callee identity authentication service; and responsive to receiving, from said external server, an authenticated callee identity of a callee utilizing said destination device, transferring said authenticated callee identity to an origin device, such that a caller initiating said call at said origin device is informed of an identity of a party answering said call.

20 Claims, 4 Drawing Sheets

U.S. PATENT DOCUMENTS

| | | | |
|---|---|---|---|
| 5,164,983 | A | 11/1992 | Brown et al. |
| 5,276,731 | A | 1/1994 | Arbel et al. |
| 5,283,833 | A | 2/1994 | Church et al. |
| 5,303,042 | A | 4/1994 | Lewis et al. |
| 5,325,421 | A | 6/1994 | Hou et al. |
| 5,369,699 | A | 11/1994 | Page et al. |
| 5,414,755 | A | 5/1995 | Bahler et al. |
| 5,444,774 | A | 8/1995 | Freides |
| 5,479,488 | A | 12/1995 | Lennig et al. |
| 5,499,288 | A | 3/1996 | Hunt et al. |
| 5,506,898 | A | 4/1996 | Constantini |
| 5,533,109 | A | 7/1996 | Baker |
| 5,533,115 | A | 7/1996 | Hollenbach et al. |
| 5,535,256 | A | 7/1996 | Maloney et al. |
| 5,557,658 | A | 9/1996 | Gregorek et al. |
| 5,561,707 | A | 10/1996 | Katz |
| 5,566,229 | A | 10/1996 | Hou et al. |
| 5,590,188 | A | 12/1996 | Crockett |
| 5,594,784 | A | 1/1997 | Velius |
| 5,623,539 | A | 4/1997 | Bassenyemukasa et al. |
| 5,646,839 | A | 7/1997 | Katz |
| 5,646,988 | A | 7/1997 | Hikawa |
| 5,655,007 | A * | 8/1997 | McAllister ............... 379/91.01 |
| 5,673,404 | A | 9/1997 | Cousins et al. |
| 5,694,459 | A | 12/1997 | Backaus et al. |
| 5,696,880 | A | 12/1997 | Gustafson et al. |
| 5,771,279 | A | 6/1998 | Cheston et al. |
| 5,790,637 | A | 8/1998 | Johnson et al. |
| 5,796,791 | A | 8/1998 | Polcyn |
| 5,802,526 | A | 9/1998 | Fawcett et al. |
| 5,806,045 | A | 9/1998 | Biorge et al. |
| 5,828,735 | A | 10/1998 | Farfan |
| 5,832,072 | A | 11/1998 | Rozenbilt |
| 5,864,616 | A | 1/1999 | Hartmeier |
| 5,864,872 | A | 1/1999 | Lee et al. |
| 5,867,572 | A | 2/1999 | MacDonald |
| 5,875,240 | A | 2/1999 | Silverman |
| 5,915,001 | A | 6/1999 | Uppaluru |
| 5,933,828 | A | 8/1999 | Eitel et al. |
| 5,937,044 | A | 8/1999 | Kim |
| 5,940,476 | A | 8/1999 | Morganstein et al. |
| 5,946,378 | A | 8/1999 | Farfan |
| 5,946,386 | A | 8/1999 | Rogers et al. |
| 5,946,388 | A | 8/1999 | Walker et al. |
| 5,946,654 | A | 8/1999 | Newman et al. |
| 5,948,061 | A | 9/1999 | Merriman et al. |
| 5,953,399 | A | 9/1999 | Farris et al. |
| 5,978,450 | A | 11/1999 | McAllister et al. |
| 5,978,467 | A | 11/1999 | Walker et al. |
| 5,991,364 | A | 11/1999 | McAllister et al. |
| 6,014,439 | A | 1/2000 | Walker et al. |
| 6,014,626 | A | 1/2000 | Cohen |
| 6,018,718 | A | 1/2000 | Walker et al. |
| 6,028,917 | A | 2/2000 | Creamer et al. |
| 6,038,305 | A | 3/2000 | McAllister et al. |
| 6,041,103 | A | 3/2000 | La Porta et al. |
| 6,046,762 | A | 4/2000 | Sonesh et al. |
| 6,047,053 | A | 4/2000 | Miner et al. |
| 6,052,438 | A | 4/2000 | Wu et al. |
| 6,058,364 | A | 5/2000 | Goldberg et al. |
| 6,064,730 | A | 5/2000 | Ginsberg et al. |
| 6,067,347 | A | 5/2000 | Farris et al. |
| 6,087,574 | A | 7/2000 | Kitashima et al. |
| 6,088,435 | A | 7/2000 | Barber et al. |
| 6,088,444 | A | 7/2000 | Walker et al. |
| 6,091,968 | A | 7/2000 | Koohgoli et al. |
| 6,101,242 | A | 8/2000 | McAllister et al. |
| 6,122,357 | A | 9/2000 | Farris et al. |
| 6,125,178 | A | 9/2000 | Walker et al. |
| 6,141,328 | A | 10/2000 | Nabkel et al. |
| 6,144,671 | A * | 11/2000 | Perinpanathan et al. ..... 370/409 |
| 6,144,723 | A | 11/2000 | Truchon et al. |
| 6,151,387 | A | 11/2000 | Katz |
| 6,157,621 | A * | 12/2000 | Brown et al. ................ 370/310 |
| 6,157,655 | A | 12/2000 | Shtivelman |
| 6,167,119 | A | 12/2000 | Bartholomew et al. |
| 6,173,041 | B1 | 1/2001 | Borland et al. |
| 6,178,230 | B1 | 1/2001 | Borland |
| 6,178,240 | B1 | 1/2001 | Walker et al. |
| 6,185,288 | B1 | 2/2001 | Wong |
| 6,205,204 | B1 | 3/2001 | Morganstein et al. |
| 6,208,713 | B1 | 3/2001 | Rahrer et al. |
| 6,208,729 | B1 | 3/2001 | Agraharam et al. |
| 6,222,920 | B1 | 4/2001 | Walker et al. |
| 6,223,156 | B1 | 4/2001 | Goldberg et al. |
| 6,233,234 | B1 | 5/2001 | Curry et al. |
| 6,246,759 | B1 | 6/2001 | Greene et al. |
| 6,246,988 | B1 | 6/2001 | Schier |
| 6,259,771 | B1 | 7/2001 | Kredo et al. |
| 6,263,051 | B1 | 7/2001 | Saylor et al. |
| 6,282,275 | B1 | 8/2001 | Gurbani et al. |
| 6,285,749 | B1 | 9/2001 | Manto |
| 6,317,484 | B1 | 11/2001 | McAllister |
| 6,324,276 | B1 | 11/2001 | Uppaluru et al. |
| 6,327,343 | B1 | 12/2001 | Epstein et al. |
| 6,327,346 | B1 | 12/2001 | Infosino |
| 6,327,347 | B1 | 12/2001 | Gutzmann |
| 6,330,308 | B1 | 12/2001 | Cheston et al. |
| 6,349,132 | B1 | 2/2002 | Wesemann et al. |
| 6,356,638 | B1 | 3/2002 | Hardy et al. |
| 6,363,145 | B1 | 3/2002 | Shaffer et al. |
| 6,381,329 | B1 | 4/2002 | Uppaluru et al. |
| 6,393,112 | B1 | 5/2002 | Gottlieb et al. |
| 6,400,804 | B1 | 6/2002 | Bilder |
| 6,404,858 | B1 * | 6/2002 | Farris et al. ............... 379/88.02 |
| 6,408,272 | B1 | 6/2002 | White et al. |
| 6,424,709 | B1 | 7/2002 | Doyle et al. |
| 6,430,174 | B1 | 8/2002 | Jennings et al. |
| 6,430,276 | B1 | 8/2002 | Bouvier et al. |
| 6,430,282 | B1 * | 8/2002 | Bannister et al. ........ 379/211.02 |
| 6,442,242 | B1 | 8/2002 | McAllister et al. |
| 6,456,698 | B1 | 9/2002 | Morganstein et al. |
| 6,463,127 | B1 | 10/2002 | Maier et al. |
| 6,477,246 | B1 | 11/2002 | Dolan et al. |
| 6,480,599 | B1 | 11/2002 | Ainslie et al. |
| 6,487,291 | B1 | 11/2002 | Walker et al. |
| 6,502,745 | B1 | 1/2003 | Stimson et al. |
| 6,519,570 | B1 | 2/2003 | Faber et al. |
| 6,522,743 | B1 | 2/2003 | Hurd |
| 6,526,131 | B1 | 2/2003 | Zimmerman et al. |
| 6,529,585 | B2 | 3/2003 | Ng et al. |
| 6,535,492 | B2 | 3/2003 | Shtivelman |
| 6,535,582 | B1 | 3/2003 | Harris |
| 6,539,080 | B1 | 3/2003 | Bruce et al. |
| 6,556,127 | B1 | 4/2003 | Moser et al. |
| 6,606,596 | B1 | 8/2003 | Zirngibl et al. |
| 6,614,885 | B2 * | 9/2003 | Polcyn .................... 379/88.02 |
| 6,631,181 | B1 | 10/2003 | Bates et al. |
| 6,636,590 | B1 | 10/2003 | Jacob et al. |
| 6,639,982 | B1 | 10/2003 | Stuart et al. |
| 6,647,097 | B1 | 11/2003 | Nashirozawa |
| 6,658,093 | B1 | 12/2003 | Langseth et al. |
| 6,665,377 | B1 | 12/2003 | McKinley et al. |
| 6,665,380 | B1 | 12/2003 | Cree et al. |
| 6,678,359 | B1 | 1/2004 | Gallick |
| 6,683,941 | B2 | 1/2004 | Brown et al. |
| 6,697,456 | B2 | 2/2004 | Chan et al. |
| 6,700,972 | B1 | 3/2004 | McHugh et al. |
| 6,707,906 | B1 | 3/2004 | Ben-Chanoch |
| 6,711,239 | B1 | 3/2004 | Borland |
| 6,711,249 | B2 | 3/2004 | Weissman et al. |
| 6,735,287 | B2 | 5/2004 | Vishik et al. |
| 6,765,995 | B1 | 7/2004 | Kobayashi |
| 6,768,792 | B2 * | 7/2004 | Brown et al. ............ 379/207.14 |

| | | |
|---|---|---|
| 6,775,360 B2 | 8/2004 | Davidson et al. |
| 6,785,379 B1 | 8/2004 | Rogers et al. |
| 6,804,224 B1 | 10/2004 | Schuster et al. |
| 6,819,945 B1 | 11/2004 | Chow et al. |
| 6,826,173 B1 | 11/2004 | King et al. |
| 6,826,276 B2 | 11/2004 | Brown et al. |
| 6,842,767 B1 | 1/2005 | Partovi et al. |
| 6,845,155 B2 | 1/2005 | Elsey |
| 6,877,093 B1 | 4/2005 | Desai et al. |
| 6,885,734 B1 | 4/2005 | Eberle et al. |
| 6,901,255 B2 | 5/2005 | Shostak |
| 6,925,166 B1 | 8/2005 | Chan |
| 6,937,699 B1 | 8/2005 | Schuster et al. |
| 7,003,466 B2 * | 2/2006 | Brown et al. ............. 704/275 |
| 7,027,576 B2 * | 4/2006 | Schwab et al. ......... 379/201.11 |
| 7,042,988 B2 | 5/2006 | Juitt et al. |
| 7,076,051 B2 * | 7/2006 | Brown et al. ........... 379/265.09 |
| 7,103,172 B2 * | 9/2006 | Brown et al. ........... 379/266.01 |
| 7,130,405 B2 * | 10/2006 | Brown et al. ........... 379/210.02 |
| 7,139,390 B2 * | 11/2006 | Brown et al. ........... 379/265.02 |
| 7,155,608 B1 * | 12/2006 | Malik et al. .................. 713/170 |
| 7,251,318 B1 | 7/2007 | Henderson |
| 7,305,550 B2 | 12/2007 | Oliver et al. |
| 7,426,264 B1 | 9/2008 | Henderson |
| 7,460,533 B1 * | 12/2008 | Tripathi et al. .............. 370/390 |
| 7,486,779 B2 * | 2/2009 | Brown et al. ............. 379/88.02 |
| 2001/0003092 A1 * | 6/2001 | Sjodin ........................ 455/433 |
| 2001/0047414 A1 | 11/2001 | Yoon et al. |
| 2002/0046030 A1 | 4/2002 | Havista et al. |
| 2002/0058494 A1 | 5/2002 | Timonen et al. |
| 2002/0064261 A1 | 5/2002 | Afana |
| 2002/0091937 A1 | 7/2002 | Ortiz |
| 2002/0118807 A1 | 8/2002 | Pederson |
| 2002/0131399 A1 | 9/2002 | Philonenko |
| 2002/0136363 A1 | 9/2002 | Stumer et al. |
| 2002/0141561 A1 | 10/2002 | Duncan et al. |
| 2002/0147818 A1 | 10/2002 | Wengrovite |
| 2002/0164000 A1 | 11/2002 | Cohen et al. |
| 2002/0181671 A1 | 12/2002 | Logan |
| 2002/0184096 A1 | 12/2002 | Kawahara et al. |
| 2002/0196927 A1 | 12/2002 | Johnson et al. |
| 2003/0031309 A1 | 2/2003 | Rupe et al. |
| 2003/0032414 A1 | 2/2003 | Melaku et al. |
| 2003/0043974 A1 | 3/2003 | Emerson |
| 2003/0053615 A1 | 3/2003 | Anderson et al. |
| 2003/0059007 A1 | 3/2003 | Beyda |
| 2003/0064709 A1 | 4/2003 | Gailey et al. |
| 2003/0081744 A1 | 5/2003 | Gurfein et al. |
| 2003/0095542 A1 | 5/2003 | Chang et al. |
| 2003/0103617 A1 | 6/2003 | Brown et al. |
| 2003/0103618 A1 | 6/2003 | Brown et al. |
| 2003/0103619 A1 | 6/2003 | Brown et al. |
| 2003/0108158 A1 | 6/2003 | Brown et al. |
| 2003/0108159 A1 * | 6/2003 | Brown et al. ............. 379/88.01 |
| 2003/0108160 A1 | 6/2003 | Brown et al. |
| 2003/0108162 A1 | 6/2003 | Brown et al. |
| 2003/0108184 A1 | 6/2003 | Brown et al. |
| 2003/0108185 A1 | 6/2003 | Brown et al. |
| 2003/0108186 A1 | 6/2003 | Brown et al. |
| 2003/0108187 A1 | 6/2003 | Brown et al. |
| 2003/0112935 A1 | 6/2003 | Brown et al. |
| 2003/0112941 A1 | 6/2003 | Brown et al. |
| 2003/0112949 A1 | 6/2003 | Brown et al. |
| 2003/0112956 A1 | 6/2003 | Brown et al. |
| 2003/0114139 A1 | 6/2003 | Brown et al. |
| 2003/0114142 A1 | 6/2003 | Brown et al. |
| 2003/0156700 A1 | 8/2003 | Brown et al. |
| 2004/0029567 A1 | 2/2004 | Timmins et al. |
| 2004/0052337 A1 | 3/2004 | Brown et al. |
| 2004/0057569 A1 | 3/2004 | Busey et al. |
| 2004/0066916 A1 | 4/2004 | Brown et al. |
| 2005/0041649 A1 | 2/2005 | Wilson |
| 2005/0141679 A1 | 6/2005 | Zirngibl et al. |
| 2007/0058787 A1 | 3/2007 | Bajwa et al. |
| 2007/0083606 A1 * | 4/2007 | Malik et al. ................. 709/207 |
| 2007/0286384 A1 * | 12/2007 | Christensen et al. ... 379/201.07 |

FOREIGN PATENT DOCUMENTS

| | | | |
|---|---|---|---|
| EP | 0676882 | A2 | 10/1995 |
| JP | 8139797 | A | 5/1996 |
| JP | 8139799 | A | 5/1996 |
| JP | 10294784 | A | 11/1998 |

OTHER PUBLICATIONS

WPAT 95-346415, Derwent.
WPAT 96-315499, Derwent.
WPAT 99-031530, Derwent.
WPAT Derwent 1994-067503.
WPAT Derwent 1995-346415.
WPAT Derwent 1996-315499.
WPAT Derwent 1999-031530.
Office Action Dated Mar. 24, 2010 in U.S. Appl. No. 11/554,269.
Office Action Dated Oct. 6, 2009 in U.S. Appl. No. 11/554,269.

* cited by examiner

INTERMEDIARY DEVICE BASED CALLEE IDENTIFICATION

The present application is a divisional application and claims priority from U.S. patent application Ser. No. 10/015,282 filed on Dec. 12, 2001 now U.S. Pat. No. 7,167,551.

CROSS-REFERENCE TO RELATED APPLICATIONS

The present application is related to the following applications:
(1) U.S. patent application Ser. No. 10/015,381;
(2) U.S. patent application Ser. No. 10/015,281;
(3) U.S. patent application Ser. No. 10/015,265 ;
(4) U.S. patent application Ser. No. 10/015,267 ;
(5) U.S. patent application Ser. No. 10/015,280 ;

BACKGROUND OF THE INVENTION

1. Technical Field

The present invention relates in general to telecommunications and, in particular, to voice identification. Still more particularly, the present invention relates to initiating authentication of the identity of a callee at an intermediary device.

2. Description of the Related Art

Telephone service has created communication channels worldwide, and those channels continue to expand with the advent of cellular and other wireless services. A person can simply take a telephone off-hook and dial a destination number or press a send button and be connected to a telephone line around the world.

Today, the public switching telephone network (PSTN), wireless networks, and private networks telephone services are based on the identification of the wireless telephone or wireline that a calling party uses. Services are personalized according to wireless telephone or wireline telephone number, where services associated with one telephone number are not accessible for another telephone number assigned to the same subscriber. For example, there is typically a first set of service features and billing options assigned to a home line number, a second set of service features and billing options assigned to an office line number, and a third set of service features and billing options assigned to a cellular telephone number. The networks process calls to and from each of these different subscriber telephones based on a separate telephone number.

One of the services provided by many networks is caller identification. However, caller identification (caller ID) is limited to identification the wireline or wireless telephone number and the name of the subscriber of a service. Where multiple people share a single line, only the name of the person who establishes a service is displayed as the caller ID, often causing confusion about who is actually calling.

In addition, caller ID is limited because caller ID only flows to the calling party. Further, returning the identification of the telephone number that a caller has dialed is redundant and many telephones already provide a display of the numbers dialed by a caller as the caller is dialing.

Therefore, in view of the foregoing, it would be advantageous to provide a method, system, and program for providing a calling party with the identity of the person answering a call (e.g. the callee). In addition, it would be advantageous to provide a method, system, and program for specifying services available to a callee at any telephony device according to the identity of the callee.

Each service provided from by the PSTN must be extensively tested for faults and requires expensive hardware for implementation. Therefore, in view of the foregoing, it would be a further advantage to provide a method, system, and program for implementing services by devices external to the PSTN.

SUMMARY OF THE INVENTION

Methods, systems, and products for informing a caller of a callee identity are disclosed that include: detecting a call receipt condition from a destination device at a trusted telephone network; brokering a connection between said destination device and an external server enabled to perform a callee identity authentication service; and responsive to receiving, from said external server, an authenticated callee identity of a callee utilizing said destination device, transferring said authenticated callee identity to an origin device, such that a caller initiating said call at said origin device is informed of an identity of a party answering said call.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
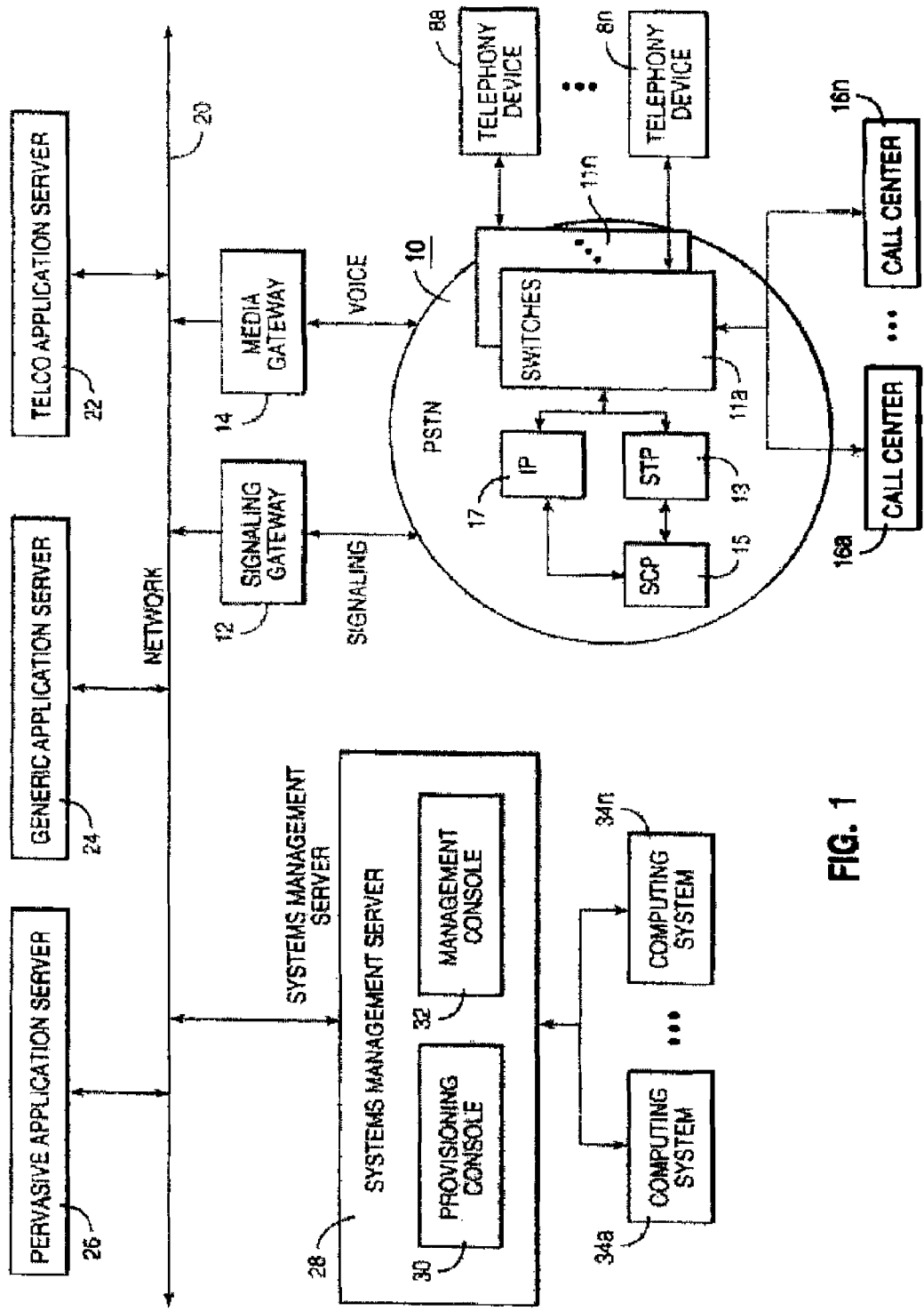
FIG. 1 depicts a block diagram of a network environment in which the present invention may be implemented.

A method, system, and program for intermediary device initiated callee authentication are provided. By authenticating a callee identity at an intermediary device, the callee identity may be transferred from the intermediary device to an origin device. The caller identity received at the origin device identifies the callee, rather than the line to which a call is made. An intermediary device may also utilize the authenticated callee identity to specify services available for a call, such that telephone lines are not limited to the services selected by the line subscriber or those services available to the caller.

One advantage of intermediary device callee identity authentication includes performing callee identification within a trusted network, wherein minimal security is necessary for transferring information within the trusted network. The intermediary device may include multiple telephone networks for multiple telephone service providers, where the service providers agree to a general level of trust for calls and information transferred across the telephone network boundaries.

However, performance of callee identity authentication within an intermediary device may be cost prohibitive in some cases because of the extensive software testing requirements and the cost of implementing hardware within the trusted network. Therefore, an intermediary device may initiate callee identity authentication by accessing an external system via an external network.

The external system includes a service that is advantageously enabled to authenticate the identity of a callee. Communications between the intermediary device and the external system may require an additional level of security and verification, since the external system is located outside the trusted network. Where an authenticated callee identity is utilized by an intermediary device to designate services available for a call, those services may also be accessible from an external system, accessible via an external network.

While in the present invention, authentication of a callee identity is described with emphasis placed on voice authentication, other methods of callee identity authentication may also be performed. Voice samples utilized for voice authentication are just one of multiple types of biometric sampling. For example, a callee may locally provide an eye scan, a fingerprint, and other biophysical identifiers that are transmitted within or outside the trusted network to authenticate the identity of the callee. Alternatively, keypad entries, such as a pin code, credit card account number, password, or other secure transaction key may be entered by a callee and utilized to authenticate the identity of the callee.

In addition, while in the present invention, authentication of a callee identity is described with emphasis upon performing authentication at the beginning of a call, authentication of a callee identity may be performed continuously throughout a call, at selected points throughout a call, and after a call. Selected points where authentication may be performed include when an additional phone pick-up is detected, when a new voice is detected at the destination device, when a call is transferred from one telephone device to another, and other routing of a call that may result in a new callee or in a call being recorded.

Further, while the present invention is described with emphasis upon a callee identity authentication being made for a call to continue, a call may also continue without callee identity authentication. However, where a callee is not identifiable, it may be advantageous to automatically log that the callee lacks proper identification and automatically record calls that lack proper callee identification.

According to another advantage of the present invention, the identity of the device utilized by a callee may also be identified. First, the identity of the device may include the number dialed to reach the callee. In particular, where a caller requests to call a particular person and the trusted network determines and dials the number at which the particular person may be reached, it may be advantageous to notify the caller of the number dialed to reach the device accessible to the callee. The intermediary network may first extend calls to multiple devices, where each device is accessible to the particular person, to locate the particular person and then connect the caller to the requested callee at one of the multiple devices.

In addition, the identity of the device may indicate the person to whom a device belongs, the type of device, or the line number utilized to access a device. For example, a caller may dial a number to reach the callee, where the device reached via the dialed number is a company wireline or wireless telephone.

Further, other information about the routing of the call to the particular device may be indicated. For example, if the call was forwarded to another number, that forwarded number and the identity of the device answered at that forwarded number may be provided to the caller. Where a call is forwarded within a call center from representative to representative, the identities of each callee representative and the line number or extension of each callee representative are recorded and forwarded with an RVID.

For purposes of the present invention, telephony devices are termed origin devices when utilized for origination of a call to an intermediary device and are termed destination devices when utilized for receipt of a call from an intermediary device. Subscribers to a call are termed callers when originating a call and are termed callees when receiving a call. Callers and callees may or may not be line subscribers to the particular telephony device utilized.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

General Network Environment

First, the network environment incorporates a Public Switching Telephone Network (PSTN) 10. As is known in the art the core of PSTN 10 may include multiple telephone networks, each owned by one of multiple independent service providers. Each telephone line is carried by an independent service provider within PSTN 10 and is typically assigned to at least one subscriber.

Switching of a call within an independent service provider=s telephone network is considered trusted movement within a trusted network because the call remains within the company=s telephone network infrastructure. However, calls may be transferred from one service provider=s telephone network to another service provider=s telephone network in generally trusted movement. Generally, service providers are in competition with one another and therefore there is general trust in transferring a call, but not trust in sharing of subscriber information beyond a subscriber number and name from one service provider to the next without security features or other arrangements.

Advantageously, each telephone network within PSTN 10 may access a data network functioning as an extension to PSTN 10 via an Intranet. Data networks may include, for example, subscriber profiles, billing information, and preferences that are utilized by a service provider to specialize services. Transfer of information between a service provider=s data network and telephone network is trusted movement in sharing of information.

Further, each telephone network within PSTN 10 may access server systems external to PSTN 10 in the Internet Protocol over the Internet or an Intranet. Such external server systems may include an enterprise server, an Internet service provider (ISP), an access service provider (ASP), a personal computer, and other computing systems that are accessible via a network. In the present embodiment, transfer of information between PSTN 10 and server systems accessible via a network 20 is untrusted and therefore may require verification and additional security. Network 20 may be preferably considered an external network.

In the present invention, network 20 may comprise a private network, an Intranet, or a public Internet Protocol network. Specifically, telco application server 22, generic application server 24, pervasive application server 26, and systems management server 28 represent server systems external to PSTN 10 that may be accessed by PSTN 10 over network 20.

In particular, telco application server 22 preferably includes multiple telco specific service applications for providing services to calls transferred to a server external to PSTN 10. In particular, a call may be transferred from PSTN 10 to telco application server 22 to receive at least one service and then the call is transferred back to PSTN 10. PSTN 10 preferably brokers the connection between the telephony device and telco application server 22. Such services may also be provided to calls within PSTN 10, however placing such services at a third party such as telco application server 22, is advantageous because adding services and information to PSTN 10 is time consuming and costly when compared with the time and cost of adding the services through telco application server 22.

In accord with an advantage of the present invention, as will be further described, the identity of both the caller and the callee may be authenticated by one of telephony devices 8a-8n, PSTN 10, or by telco application server 22. By authenticating the actual identity of the person making a phone call and the person receiving the phone call, rather than the identification of a device from which a call is made and received, an enhanced specialization of services to subscribers may be performed.

An authentication service within telco application server 22 may include identification and verification of the identity of a caller and/or callee of a particular call. Such a service may require that subscribers provide voice samples when setting up a subscription. The stored voice samples may then be compared against voice samples received for a particular call in order to authenticate the identity of a current caller or callee of the particular call.

Generic application server 24 preferably accesses independent server systems that provide services. For example, a messaging server, a financial server, an Internal Revenue Service (IRS) server, and database management system (DBMS) server may be accessed in HTTP via network 20. Each of these servers may include a telco service application that requires authentication of the subscriber before access is granted. For example, a financial server may provide a telco service application that allows an authenticated subscriber to access current financial records and request stock quotes from the financial server.

Pervasive application server 26 manages services for wirelessly networked devices. In particular, pervasive application server 26 preferably handles distribution of wireless packets of voice and data to wirelessly networked devices utilizing a standard such as short messaging service (SMS) messaging or other 3G standards.

Systems management server 28 manages subscriber personalization via the web. In particular, systems management server 28 includes browser technology that includes a provisioning console 30 for establishing a subscriber profile and a management console 32 for managing and updating the subscriber profile. A subscriber preferably accesses the consoles of systems management server 28 via the Internet utilizing a computing system, such as computing systems 34a-34n.

The subscriber profile may be accessed at systems management server 28 by other external servers and PSTN 10 via network 20. In addition, a local copy of a subscriber profile updated in systems management server 28 may be stored within a particular service provider=s data network or telephone network. Each service provider may specify the types of preferences and other information included within a subscriber profile.

In particular, a subscriber may provide a voice imprint when establishing a subscriber profile through provisioning console 30. Other types of authentication information may also be provided including, but not limited to, a password, an eye scan, a smart card ID, and other security devices. In addition, a subscriber may designate billing preferences, shopping preferences, buddy list preferences, and other preferences that enable specialized service to the subscriber when the subscriber=s identity is authenticated from the voice imprint or other identification.

Advantageously, a management agent is built into each external server to monitor the services provided by each server according to the authenticated subscriber receiving the services. By monitoring service output according to subscriber, the subscriber may then be billed according to each use of a service.

PSTN 10 preferably includes both voice and data signaling networks that interface with network 20 via gateways. Each of the gateways acts as a switch between PSTN 10 and network 20 that may compress a signal, convert the signal into Internet Protocol (other protocol) packets, and route the packets through network 20 to the appropriate server.

In particular, the voice network interfaces with network 20 through media gateway 14 which supports multiple protocol gateways including, but not limited to, SIP. SIP is a signaling protocol for Internet conferencing, telephony, presence, events notification and instant messaging.

In addition, in particular, the data signaling network interfaces with network 20 through signaling gateway 12 which supports multiple protocol gateways including, but not limited to, parlay protocol gateways and SS7 protocol gateways. Internet servers, such as telco application server 22 may include protocol agents that are enabled to interact with multiple protocols encapsulated in Internet Protocol packets including, but not limited to, SS7 protocol, parlay protocol, and SIP.

Identity Authentication and Call Control

Looking into PSTN 10, a telephone network typically includes multiple switches, such as central office switches 11a-11n, that originate, terminate, or tandem calls. Central office switches 11a-11n utilize voice trunks for transferring voice communications and signaling links for transferring signals between signaling points.

Between signaling points, one central office switch sends signaling messages to other central office switches via signaling links to setup, manage, and release voice circuits required to complete a call. In addition, between signaling points, central office switches 11a-11n query service control points (SCPs) 15 to determine how to route a call. SCPs 15 send a response to the originating central office switch containing the routing number(s) associated with the dialed number.

SCPs 15 may be general purpose computers storing databases of call processing information. While in the present embodiment SCPs 15 are depicted locally within PSTN 10, in alternate embodiments SCPs 15 may be part of an extended network accessible to PSTN 10 via a network.

One of the functions performed by SCPs 15 is processing calls to and from various subscribers. For example, an SCP may store a record of the services purchased by a subscriber, such as a privacy service. When a call is made to the subscriber, the SCP provides record of the privacy service to initiate an announcement to a caller to identify themself to the subscriber with the privacy service who is being called. According to an advantage of the invention, authentication of the identity of the subscriber receiving the call may be required before the privacy service is initiated for that subscriber.

In particular, network traffic between signaling points may be routed via a packet switch called an service transfer point (STP) 13. STP 13 routes each incoming message to an outgoing signaling link based on routing information. Further, in particular, the signaling network may utilize an SS7 network implementing SS7 protocol.

Central office switches 11a-11n may also send voice and signaling messages to intelligent peripherals (IP) 17 via voice trunks and signaling channels. IP 17 provides enhanced announcements, enhanced digit collection, and enhanced speech recognition capabilities.

According to an advantage of the present invention, the identity of a caller is authenticated according to voice authentication. Voice authentication is preferably performed by first identifying a subscriber by matching the name or other identifier spoken with a subscriber name or identifier. Next, voice authentication requires verifying that the voice audio signal matches that of the identified subscriber. However, in alternate embodiments, the identity of a subscriber may be authenticated according to passwords, eye scans, encryption, and other security devices.

In particular, to perform subscriber authentication of audio signals received from callers, IP 17 may include storage for subscriber specific templates or voice feature information, for use in authenticating subscribers based on speech. If a subscriber specific template is not stored on a local IP 17, then a remote IP containing the subscriber specific template may be accessed via a network. In addition, local IP 17 may access systems management server 28 or another repository for voice imprints to access the subscriber specific template.

Where IP 17 authenticates the identity of a caller (e.g. the subscriber placing a call), a voice identifier (VID) representing the authenticated caller identity is transferred as a signal for identifying the caller. In addition, where IP 17 authenticates the identity of a callee (e.g. the subscriber receiving a call), a reverse VID (RVID) including the callee identity is transferred as a signal for identifying the callee.

Alternatively, to perform subscriber authentication of audio signals received from callers, PSTN 10 may broker a callee identity authentication service from telco application server 22. In particular, a signaling channel is opened between central office switches 11a-11n and telco application server 22 via signaling gateway 12. In addition, a voice channel is opened between central office switches 11a-11n and telco application server 22 via media gateway 14.

Because telco application server 22 is located outside of the trusted network, there may be a time delay associated with establishing a connection to telco application server 22 and authenticating the identity of a callee that is longer than a time delay present where a callee identity is authenticated by IP 17. However, the cost difference of performing callee identification outside PSTN 10 versus within PSTN 10 will advantageously make any time delay seem insignificant. A subscriber who prefers PSTN 10 callee authentication, may be required to pay an additional fee for the speedier service.

In addition, because telco application server 22 is located outside of the trusted network, it is advantageous to establish a level of security for transactions between telco application server 22 and central office switches 11a-11n, wherein the level of security is suitable for untrusted communications. A level of security may be implemented by utilizing security based protocols, such as the secure socket layer, and by applying ordinary encryption. In particular, the level of security preferably protects the communication channel between telco application server and PSTN 10 and authenticates the identity of the server from which a callee identity authentication service is accessed. Therefore an additional feature of signaling gateway 12 and media gateway 14 is security verification.

Advantageously, RVIDs indicate through text, voice, or video the identity of a callee. For example, a callee=s name may be transferred as the identity of a callee. Alternatively, a video clip stored with the subscriber template may be transferred as the identity of a callee. Additionally, RVIDs may indicate the identity of the device utilized by a callee to provide context for a call. Further, VIDs may indicate which system or systems have authenticated the callee identity.

After a VID and/or RVID are determined by IP 17, IP 17 and SCP 15 may communicate to designate which services are available according to VID and RVID. Advantageously, by designating services according to a VID and/or RVID, subscribers are provided with services and billed for those services independent of the devices utilized by subscribers. In particular, a 1129 protocol or other protocol may be utilized to enable signal communications between IP 17 and SCPs 15.

In addition, as previously described, caller and callee authentication to determine VIDs and RVIDs may be performed by an external system, such as telco application server 22. The VID or RVID returned from telco application server 22 may be transferred from central office switches 11a-11n to SCP 15 in order to access a subscriber profile associated with the VID or RVID. Alternatively, the VID or RVID may first transfer to IP 17, where additional verification of the caller identity is performed. For example, IP 17 may control distribution of the RVID to the callee, where the callee is prompted to enter a password or additional information. IP 17 may then initiate loading the callee profile into central office switches 11a-11n if the additional callee input is verifiable for the RVID.

An origin telephony device or destination telephony device may also determine a VID and/or RVID for the caller and/or callee of a call. In particular, telephony devices 8a-8n and call centers 16a-16n may function as origin and destination telephony devices. Each of the telephony devices may include a database of voice templates that may be matched to authenticate the identity of a caller or callee. In addition, each of the telephony devices may access a third party, such as telco application server 22, to authenticate the identity of the caller or callee. In either case, the telephony device transmits a VID and/or RVID with a call to PSTN 10.

Telephony devices 8a-8n may include, but are not limited to wireline devices, wireless devices, pervasive device equipped with telephony features, a network computer, a facsimile, a modem, and other devices enabled for network communication. Advantageously, as previously described, a voice authentication functioning device may be included in each of telephony devices 8a-8n.

In addition, telephony devices 8a-8n may each incorporate a display that provides a visual output of a VID or RVID. Alternatively, such a display may be provided in a separate device connected to the line in parallel to telephones 8a-8n. According to one advantage of the present invention, the identity of the actual caller or actual callee are output to a display in association with a call. In addition, other context information about the caller including, but not limited to, the device from which the call originates or is answered, ratings for a caller or callee, and other context information may be output to a display in association with a call.

Telephony devices 8a-8n are communicatively connected to PSTN 10 via wireline, wireless, ISDN, and other communication links. Preferably, connections to telephony devices 8a-8n provide digital transport for two-way voice grade type telephone communications and a channel transporting signaling data messages in both directions between telephony devices 8a-8n and PSTN 10.

In addition to telephony devices 8a-8n, advanced telephone systems, such as call centers 16a-16n, may be communicatively connected to PSTN 10 via wireline, wireless, ISDN and other communication links. Call centers 16a-16n may include PBX systems, hold queue systems, private network systems, and other systems that are implemented to handle distribution of calls to multiple representatives or agents.

Returning to central office switches 11a-11n, typically, one central office switch exists for each exchange or area served by the NXX digits of an NXX-XXXX (seven digit) telephone number or the three digits following the area code digits (NPA) in a ten-digit telephone number. The service provider owning a central office switch also assigns a telephone number to each line connected to each of central office switches 11a-11n. The assigned telephone number includes the area code (NPA) and exchange code (NXX) for the serving central office and four unique digits (XXXX).

Central office switches 11a-11n utilize office equipment (OE) numbers to identify specific equipment, such as physical links or circuit connections. For example, a subscriber=s line might terminate on a pair of terminals on the main distribution frame of one of central office switches 11a-11n. The switch identifies the terminals, and therefore a particular line, by an OE number assigned to that terminal pair. For a variety of reasons, a service provider may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, a central office switch will detect an off-hook condition on a line and provide a dial tone. The switch identifies the line by the OE number. The central office switch retrieves profile information corresponding to the OE number and off-hook line. Then, the central office switch receives the dialed digits from the off-hook line terminal and routes the call. The central office switch may route the call over trunks and possibly through one or more central office switches to the central office switch that serves the called party=s station or line. The switch terminating a call to a destination will also utilize profile information relating to the destination, for example to forward the call if appropriate, to apply distinctive ringing, etc.

In the present invention, when a central office switch detects an off-hook condition on a line, the central office switch will then determine if a VID signal is transferred from the off-hook telephony device. If a VID is transferred, then a query is made to SCP 15 according to the VID for any services specified for the authenticated subscriber. Alternatively, a query may be transferred via network 20 to an external server, such as system management server 28, to determine the services specified for the caller. The central office switch will then receive the dialed digits from the off-hook line terminal and route the call, providing services according to those preferred by the authenticated subscriber.

In addition, an RVID may be provided in the present invention to authenticate the identity of a callee receiving the call. When a call is answered, the call is transferred back to IP 17 or telco application server 22 to authenticate the identity of the callee answering the call and load a profile for the callee.

Further, a call may be forwarded or transferred to another line number. Preferably, for each callee identified, the line number and RVID are determined and stored for the call, such that a caller is able to view the path of a call. In particular, the path preferably designates both the callees accessed and the line numbers accessed.

As another alternative to dialed digits from the off-hook line terminal, a caller may utilize a voice calling function of a telephony device for indicating how the call should be routed. For example, a caller may say the name of a preferred callee. The device or IP 17 may determine a person within the caller=s calling list that matches the voiced name. The matching person=s digits are then utilized to route the call.

RVID Authentication Context

Figure 2:
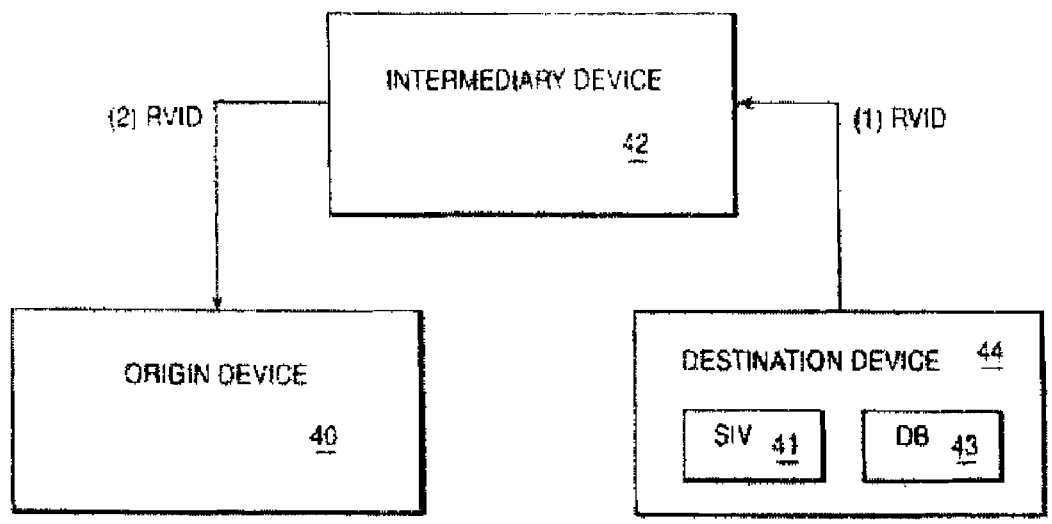
FIG. 2 illustrates a block diagram of the flow of a voice identifier authenticated by an intermediary device in accordance with the method, system, and program of the present invention.

Referring now to FIG. 2, there is illustrated a block diagram of the flow of a voice identifier authenticated by an intermediary device in accordance with the method, system, and program of the present invention.

As depicted, an intermediary device 42 authenticates a RVID for a current callee. Intermediary device 42 may include a PSTN switching network or networks. However, intermediary device 42 may also include a PBX, a call center, or other private switching system. Further, intermediary device 42 may include network servers, telco application servers, Websphere7 (Websphere7 is a registered trademark of International Business Machines, Inc.) servers, and other systems which provide call processing.

An origin device 40 is utilized by a caller to initiate a call. The caller preferably indicates a line number request. Intermediary device 42 connects origin device 40 with a destination device 44 associated with the line number request. In particular, destination device 44 may include a callee telephony device, as previously described. However, destination device 44 may also include a PBX, call center, or other private switching system that manages multiple telephony devices. Moreover, destination device 44 may include network servers, feature servers, client side devices, and other systems which provide call receipt.

In addition or as an alternative to indicating a line number request, the caller may indicate a preferred callee or callees. Identifiers for the preferred callee or callees may be transferred with a call request for output at destination device 44. In addition, intermediary device 42 may utilize the preferred callee identifier to automatically locate the device at which the preferred callee is available.

Upon detecting an answer to the call request from destination device 44, intermediary device 42 initiates authentication of the identity of the person or system that answers the call. A callee may provide a voice utterance which is transferred from destination device 44 to intermediary device 42 for purposes of callee identity authentication. Intermediary device 42 may include at least one IP with access to an extended database of voice samples, combined into a service identification/verification (SIV) function 45. SIV function 45 compares the voice utterance with the voice samples to authenticate the identity of a callee as a RVID. Then, intermediary device 42 may access a callee profile and other contextual information about a callee according to the RVID. In addition, the IP utilized to perform callee identity authentication may continue to monitor the callee voice continuously during the call and at selected points throughout the call. In particular, if another telephone device on the same line is detected off-hook, callee identity authentication may be triggered.

The authenticated RVID may be filtered and distributed to multiple locations. In particular, the RVID may be recorded for the call. Then, the RVID is preferably filtered according to caller preferences, callee preferences, and intermediary device preferences. In particular, a callee profile may include a request to block an RVID from transfer to a caller. Alternatively, a callee profile may include different titles, names, and other identifiers that are filterable according to the caller VID. For example, if the caller is a business associate, then the RVID may be filtered to include the callee=s full name and position. However, if the caller is a friend, then the RVID may be filtered to include the callee=s nickname. Filtering and blocking may be performed by a filtering service within trusted telephone network 46 and/or outside trusted telephone network 46. A callee may also block the RVID from being distributed to online vendors and others with access to VIDs and RVIDs of current calls.

When not blocked by the callee, the authenticated RVID is preferably transferred from intermediary device 42 to origin device 40 to indicate the identity of the party answering a call. Origin device 40 advantageously includes a display device or other output interface for output of the authenticated RVID to the caller, such that the identity of the callee of an incoming call is provided to the caller. The caller may be provided with an option to start communications with the callee, to transfer the call to another location, or to terminate the call.

In the present invention, a RVID preferably authenticates the identity of a callee. However, it is advantageous that the RVID also include other information that provides a context for a call. Therefore, intermediary device 42 preferably captures and stores the line number utilized to access the callee. As a call is forwarded or transferred, the line number utilized to access the current callee is preferably updated.

For example, where a caller dials a line number and that line number is accessed to reach the callee, displaying the line number to the caller as party of the RVID informs the caller that the callee was available at the number dialed. In another example, where a call is forwarded from one line number to another, it would be advantageous to indicate in the RVID that the call was forwarded and provide the forwarded to line number, unless blocked by the callee or subscriber of the forwarded to line number. Further, a call received at a call center may be forwarded to a representative at a particular extension. Advantageously, at each stage that a call is transferred within the call center, the line number or extension number that a call is connected with is determined and included in an updated RVID to the caller. Further, where the caller only enters an identifier for a preferred callee and the intermediary device locates the callee, it would be advantageous to include the line number to enhance the callee identity. Therefore, in general, for each switch of a call to a new line number, the caller is preferably informed of the line number to provide additional context to the identity of a callee.

Other examples of context information include, but are not limited to, the GPS location or time zone of the callee location, the device at which the call is received, the subject matter that a callee is willing to participate in, and whether the callee is calling on behalf of another, may be included in a RVID. Further, the identity of the device or system that performed the callee authentication may be included in a RVID.

A RVID may be transferred in multiple protocols, including, but not limited to, Interface Definition Language (IDL). A RVID may include a range of information, where each type of information may be tagged or identified in some other manner. For example, the following tagged RVID may be transmitted to represent an authenticated identity of a callee:
[name] Jon Smith
[line] 222-101-0000
[device] Jane Couch=s business phone
[location] Central Time zone
[subject] Project A
[authenticated by] External authentication service #40

The tagged RVID may be updated during a call if the call is transferred to another line with a new callee:
[name] Tad Frizzell
[forwarded to line] 424-101-0005
[device forwarded to] Tad Frizzell=s business phone
[location] Eastern Time Zone
[subject] Project A
[previous line] 222-101-0000

Figure 3:
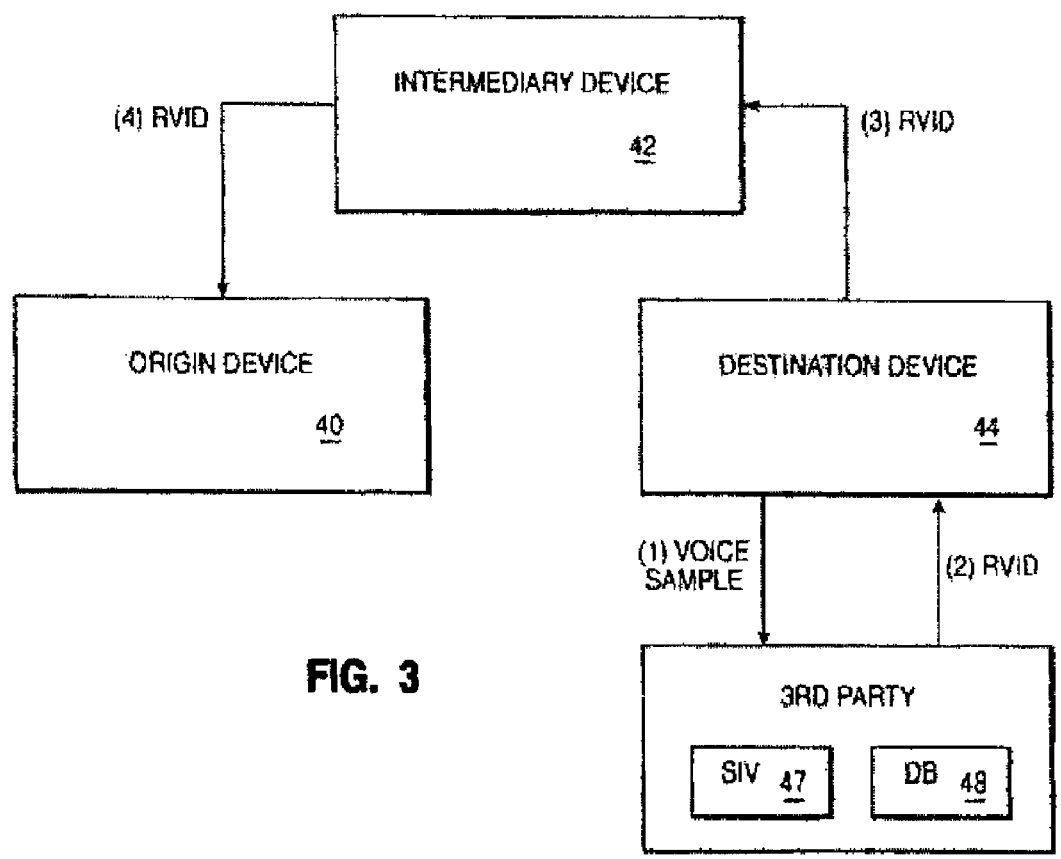
FIG. 3 depicts a block diagram of the flow of a voice identifier authenticated by an external system accessible from an intermediary device in accordance with the method, system, and program of the present invention.

With reference now to FIG. 3, there is depicted a block diagram of the flow of a voice identifier authenticated by an external device accessible from an intermediary device in accordance with the method, system, and program of the present invention.

As illustrated, intermediary device 42 may access an external system with a request for callee identity authentication. In the present embodiment, intermediary device 42 connects to external network 20 via signal and media gateways. In particular, by accessing services via external network 20, intermediary device 42 reaches outside of trusted network boundary 46. Therefore, additional levels of security, such as transfer of information utilizing a secure socket layer (SSL) and authenticating the location of a server performing the services, may be required.

Telco application server 22 provides an external system enabled to authenticate a callee identity. Telco application server 22 may include an application that functions to identify a voice utterance and verify the voice utterance by comparison with a voice sample. Telco application server 22 may access external databases of voice samples. In addition, telco application server 22 may access voice samples via a general applications server, a systems management server, or telephony devices accessible via network 20.

Telco applications server authenticates a callee identity as a RVID that is transferred into trusted network boundary 46 to reach intermediary device 42. Intermediary device 42 may then transfer the RVID to origin device 40. In addition, intermediary device 42 may utilize the RVID to access a callee profile within the trusted network or from an external system. In particular, a complete callee profile may be combined from accessing callee profile components from systems within the trusted network and external to the trusted network.

Another function of telco application server 22 is providing voice samples from a database to intermediary device 42. Intermediary device 42 may then perform callee identity authentication utilizing the voice samples received from telco application server 22. Telco application server 22 may access voice samples from multiple data storage systems accessible via network 20.

By accessing a RVID or voice samples from telco application server 22, the functionality of intermediary device 42 is expanded without requiring the addition of costly hardware to intermediary device 42. Extending outside trusted network boundary 46 to transfer a call or access information may require additional layers of security and verification, however moving services outside trusted network boundary 46 will allow an increase in services, reduce the cost of services, and allow greater competition to provide services.

Further, telco application server 22 may continue to monitor a call while in progress. A periodic sampling may be taken of the callee voice. In addition, triggers, such as detecting another phone off-hook, may initiate sampling current callee voices.

Figure 4:
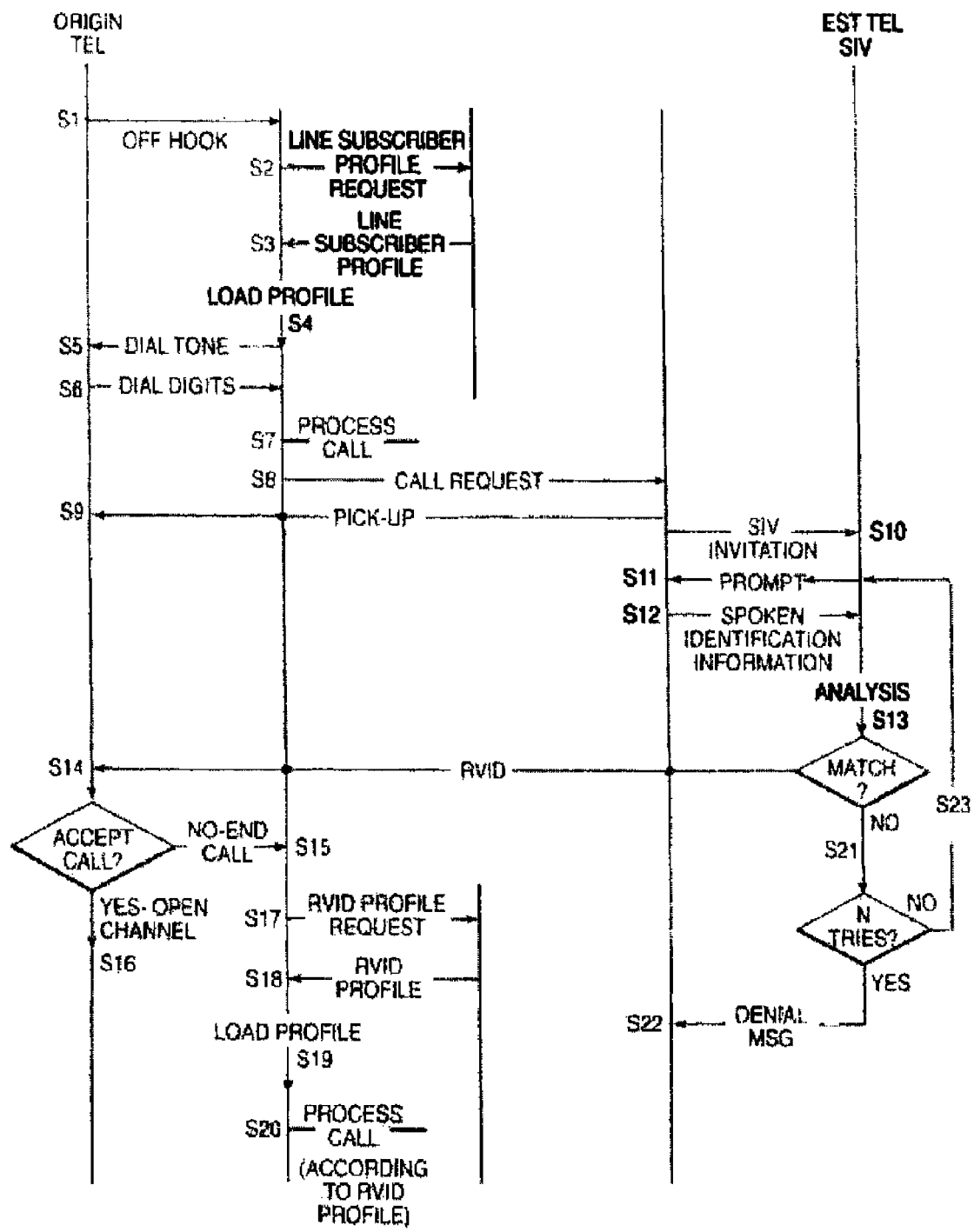
FIG. 4 illustrates a flow diagram of a signal flow and processing where an intermediary device authenticates a callee identity in accordance with the method, system, and program of the present invention.

Referring now to FIG. 4, there is illustrated a flow diagram of a signal flow and processing where an intermediary device authenticates a caller identity in accordance with the method, system, and program of the present invention. A standard telephone device is assumed for the Atel@ origin device in the present example. However, a similar signal flow may be applied to other types of origin devices.

The caller lifts a handset creating an off-hook state in the origin device and a corresponding change in state of an off-hook signal to the central office (step S1). In response to detecting an off-hook signal at the central office, a dial tone may be extended to the origin device (step S2). Alternatively the dial-tone may be extended to the origin device after a line subscriber profile has been loaded. In addition, when an off-hook signal is detected at the central office, a register is preferably assigned to the call.

Next, dialed digits may be received from the origin device (step S3). The caller may utilize multiple available formats for indicating a wireless or wireline telephone number including, but not limited to, voice dialing, keypad entry, or stylus selections. Further, a caller may select an RVID for a preferred callee, wherein the central office will initiate a service to search for the callee at devices accessible to the callee. In particular, the service may be located within an IP that is enabled to track the line numbers utilized by a particular RVID and query each line number for the callee.

In general, the central office utilizes the dialed digits to route the call to the central office servicing the telephone number and extend the call to that telephone number line (step S4). In response to detecting an off-hook state at a destination device connected to the telephone number line, a pickup signal is returned to the central office (step S5).

In response to detecting a pickup at a destination point, the central office triggers a SIV initiation to an IP within the PSTN network (step S6). The call is preferably transferred to the IP such that a voice channel and signal channel are opened between the destination device and the IP. The IP preferably responds to a SIV initiation with a prompting instruction to the callee to provide specific identifying information (step S7). It should be mentioned that although the IP could passively monitor any speech that the callee may utter, it is advantageous to specifically prompt the callee. For example, the IP may play an audio prompt message asking the callee to APlease say your full name.@ In addition, the prompt may request other identifying information such as a service provider and subject of the call, for example. Further, the central office may trigger a SIV initiation to an IP at other times during a call. The spoken identification information at the destination device is transferred through the central office to the IP (step S8).

Analysis is performed on the spoken identification information to determine a name of a callee and extract speech characteristics information (step S9). A voice template or other voice pattern information may be stored at a data storage system within an extended network accessible within the trusted network boundary according to a callee identity. In addition, as will be described in FIG. 5, a voice template or other voice pattern information may be stored at an external data storage system accessible outside the trusted network boundary according to a callee identity.

Preferably, the SIV function of an IP compares the extracted speech information to the stored pattern information, to identify and authenticate the particular callee. If there is a match between the extracted speech information and the stored pattern information, then a RVID signal containing the authenticated identity of the callee is transferred to the central office for storage in the register assigned to the call (step S10). In addition, the call is returned with the RVID to the central office and the RVID is recorded in the SCP.

In addition to authenticating the identity of the callee receiving a call, the identity of the device utilized to receive the call and each line number accessed during a call may be included in a RVID. Each destination device may include an identification number that is stored in the register assigned to a call and attached to the RVID of a call by the central office. Alternatively, where a single OE line includes multiple outlets, the device at each outlet may be identified according to the location of the outlet. Further, where multiple devices are utilized to answer a call, the identity of each device may be detected and provided in an RVID. Moreover, the context of a call, including a device identity, may be inferred from the device location, device owner and other context.

Once a RVID is received at the central office for a call, the central office triggers a request to an SCP for a callee profile according to the RVID (step S11). The SCP searches for a callee profile in a local data storage system or a remote data storage system within the extended trusted network. Alternatively, the SCP may access the callee profile according to RVID from a data storage system accessible outside the trusted network boundary. Further, in lieu of, or in addition to the information stored at the SCP, a request may be extended from the PSTN to other servers storing information about a callee according to profile, depending on the services to be provided to a callee. The SCP returns a callee profile that indicates additional personal information about a callee, billing information, and services selected by a callee (step S12). The central office loads the profile into the register associated to the call (step S13).

Next, the RVID is filtered (step S14). The RVID may be filtered to block the RVID from transfer to the caller, to specify the content of the RVID for transfer to the caller, and to specify the content of the RVID for access by a data mining service or online retailers. Then, the RVID is transferred via the signal channel to the origin device (step S15). The origin device preferably controls output of the RVID via, for example, a graphical user interface or a speaker, such that a caller is able to decide whether to a speak with an identified callee.

The importance of forwarding the callee RVID to the origin device is that the caller receives an identification of the person who has answered a call. Output of a callee RVID, including a callee name, device identification, geographic context, and other information, is more advantageous than a typical caller ID service that indicates the line number and person billed for the line number because with the RVID, the actual callee is identified, but the actual line number may be blocked from the caller.

Not identifying a line number of a destination device is particularly advantageous where a destination device includes a call center for managing multiple telephony devices, where each telephony device is assigned a wireline number. A caller may dial a number that accesses the call center, where the call center transfers the call to a telephony device answered by a representative. Rather than disclosing the line number of the telephony device utilized by the first representative, an identifier for the representative may be transferred to the caller. In particular, where a caller dials a first number and then asks to be transferred to another line managed by a call center or private switching system, it may be advantageous for a company to protect the line numbers utilized within the company, but also to provide a customer with an identification of the employee answering a call.

Alternatively, line numbers accessed during a call may be included in a filtered RVID to the caller, such that the caller is enabled to trace the path of a call. Where a call is forwarded to another line number, the subscriber to that line number may select to block the line number or allow it to be published in an RVID accessible to the caller. Businesses may also find that it is advantageous to allow a caller to view the extension of representatives, in addition to the identity of a representative, such that the extension of a representative is captured to enter during future calls.

The call is then processed according to the callee profile (step S16). In particular, the identity of the current callee may continue to be authenticated. Further, other context to a call may be updated in a tagged RVID that is recorded and may be transferred to the caller.

If there is not a match of the extracted speech information with the voice templates, then a determination is made as to whether a callee has made more than n tries to speak identification information that has not matched (step S17). If the callee has not made more than n tries, then a prompt is output to the callee to provide another spoken utterance. If the callee has made more than n tries, then a denial signal is transferred to the central office (step S18). In addition, instructions for creating a voice template may be provided. Further, the line subscriber profile associated with the line number of the destination device may be accessed to determine services available to the destination device. In addition, the central office may automatically initiate recording of the call where a callee identity is not authenticated.

It should be noted that with each transfer of an RVID, the central office, the SCP, and the origin device may each record and filter the RVID. In particular, filtering the RVID may require blocking all or portions of the content of the RVID.

Figure 5A:
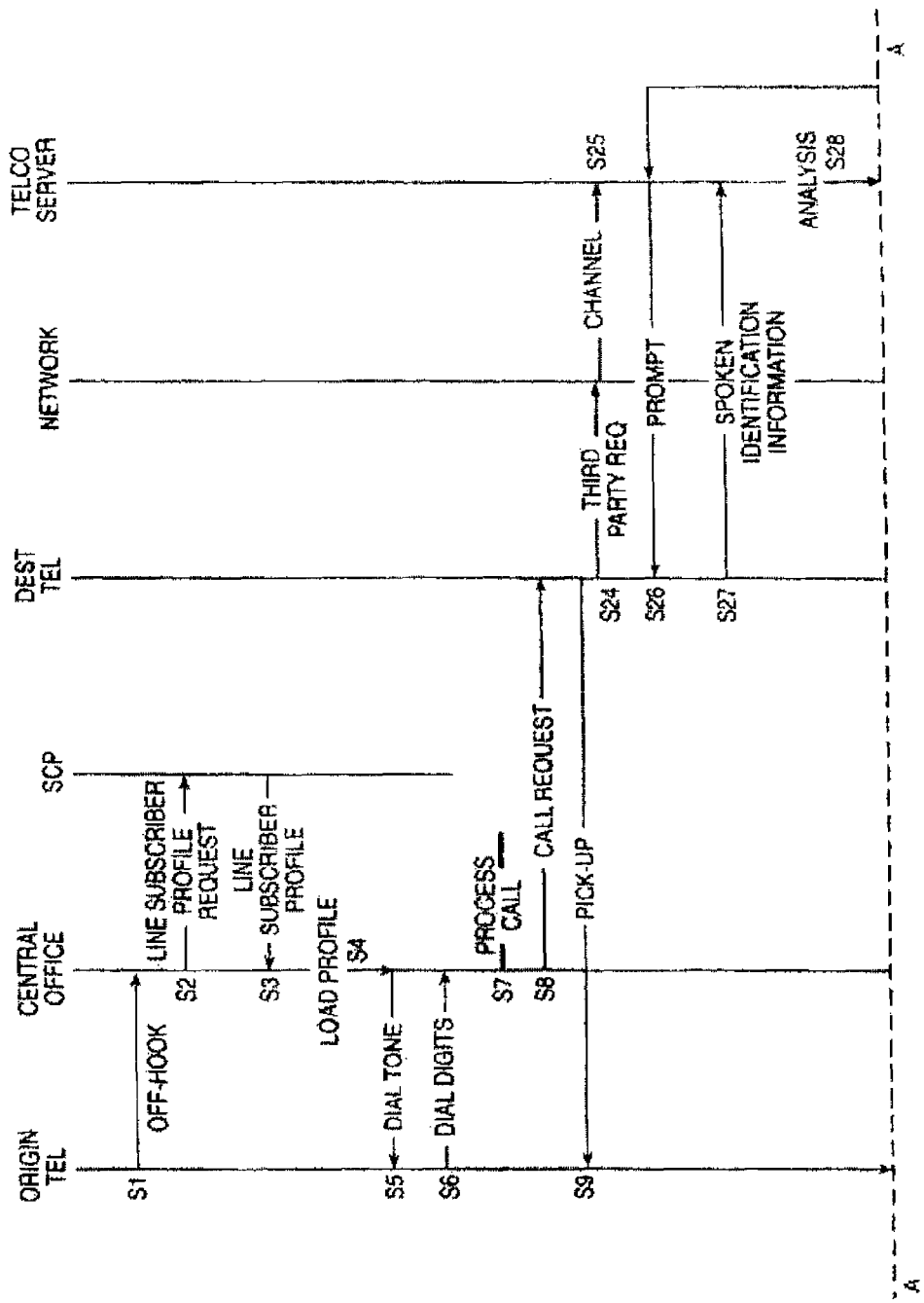
FIG. 5A depicts a flow diagram of a signal flow and processing where an external system is accessed by an intermediary device to authenticate a callee identity in accordance with the method, system, and program of the present invention.

With reference now to FIG. 5, there is depicted a flow diagram of a signal flow and processing where an external system is accessed by an intermediary device to authenticate a callee identity in accordance with the method, system, and program of the present invention.

In response to receiving on off-hook state at the central office, a register is created for a call. A request for a callee authentication service is initiated by the central office to the signaling and media gateways (step S20) The signaling gateway initiates a secure signal channel between the central office and a telco application server that provides a callee authentication service (step S21). The media gateway initiates a secure media channel between the central office and the telco application server (step S22). Further, the central office may trigger a callee authentication service at other times during a call.

The call may then be transferred to the telco application server, however the central office brokers the communication channels between the telco application server and origin and destination devices. In particular, the telco application server may allow a caller to listen to the callee identity authentication process or parts of the process. Alternatively, only a connection between the telco application server and the destination device may be brokered, such that when the call is returned to the central office, the central office establishes the communication channel between the origin and destination devices.

To provide service, the authorization service application of the telco application server provides a prompting instruction to the callee to provide specific identifying information (step S23). For example, the authorization service application may play an audio prompt message asking the callee to APlease say your full name.@ In addition, the prompt may request other identifying information such as a service provider and subject of the call, for example. The spoken identification information is then received at the central office from the destination device and transferred via the media gateway to the telco application server (step S24).

Analysis is performed on the spoken identification information to determine a name of a caller and extract speech characteristics information (step S25). A voice template or other voice pattern information may be accessible to the telco application server from a local or remote database management system. Preferably, the authorization service application compares the extracted speech information to the stored pattern information, to identify and authenticate the particular callee. If there is a match between the extracted speech information and the stored pattern information, then a RVID signal containing the authenticated identity of the callee is distributed to the central office (step S26), the call is returned to the central office, and the RVID stored in the SCP.

If there is not a match of the extracted speech information with the voice templates, then a determination is made as to whether a callee has made more than n tries to speak identification information that has not matched (step S27). If the callee has not made more than n tries, then a prompt is output to the callee to provide another spoken utterance. If the callee has made more than n tries, then a denial message is output to the central office (step S28) and the call is returned thereto. In addition, instructions for creating a voice template may be provided.

It should be noted that with each transfer of an RVID, the central office, signaling gateway, telco application server, and origin device may each record and filter the RVID. In particular, filtering the RVID may require blocking all or portions of the content of the RVID.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for informing a caller of a callee identity, comprising:
   detecting a call receipt condition from a destination device at a trusted telephone network;
   brokering a connection between said destination device and an external server enabled to perform a callee identity authentication service; and
   responsive to receiving, from said external server, an authenticated callee identity of a callee utilizing said destination device, transferring said authenticated callee identity to an origin device, such that a caller initiating said call at said origin device is informed of an identity of a party answering said call.

2. The method of claim 1 wherein the brokering a connection between said destination device and an external server further comprises:
   transmitting a request for said callee identity authentication service via a signal gateway to a network for accessing said external server;
   responsive to receiving access to said callee identity authentication service, transferring a call to said external server;
   transferring a prompt for a voice utterance, received from said external server via a media gateway, to said destination device;
   transferring a voice utterance by said callee through said media gateway to said network for accessing said external server; and
   receiving said authenticated callee identity via said signal gateway at said trusted telephone network.

3. The method for informing a caller of a callee identity according to claim 1, further comprising:
   filtering content of said authenticated callee identity before transfer to said origin device.

4. The method for informing a caller of a callee identity according to claim 3, further comprising:
   filtering content of said authenticated callee identity according to filtering preferences associated with said authenticated callee identity.

5. The method for informing a caller of a callee identity according to claim 3, further comprising:
   filtering content of said authenticated callee identity according to an identity of said caller.

6. The method for informing a caller of a callee identity according to claim 1, further comprising:
   filtering said authenticated callee identity to block at least a portion of the content of said authenticated callee identity.

7. The method for informing a caller of a callee identity according to claim 1, further comprising:
   detecting a line number utilized to access said destination device; and
   transferring said line number with said authenticated callee identity to said origin device.

8. The method for informing a caller of a callee identity according to claim 1, further comprising:
   detecting a line number utilized to access said destination device; and
   blocking said line number from transfer to said origin device with said authenticated callee identity.

9. The method for informing a caller of a callee identity according to claim 1, further comprising:
   detecting a call forwarded from a first line number to a second line number; and
   transferring an indicator to said origin device with said authenticated callee identity that said call is forwarded to said second line number.

10. The method for informing a caller of a callee identity according to claim 1, further comprising:
    detecting a call transferred from a first line number to a second line number during a call; and
    brokering a connection between a current destination device accessible via said second line number and an external server enabled to perform a callee identity authentication service; and
    responsive to receiving, from said external server, a current authenticated callee identity of a current callee utilizing said current destination device, transferring said current authenticated callee identity to said origin device to update said caller.

11. The method for informing a caller of a callee identity according to claim 1, further comprising:
    brokering a connection between said destination device and said external server periodically throughout said call to authenticate said callee identity;
    responsive to receiving, from said external server, a current authenticated callee identity differing from a previously received authenticated callee identity, transferring said current authenticated callee identity to said origin device to update said caller that the identity of the callee has changed.

12. A system for informing a caller of a callee identity, comprising:
    a trusted telephone network enabled to process a call;
    a computer processor, a computer memory operatively coupled to the computer processor, the computer memory having disposed within it computer program instructions capable, when executed by the computer processor, of causing the system to carry out the steps of
    detecting a call receipt condition from a destination device at said trusted telephone network;
    brokering a connection between said destination device and an external server enabled to perform a callee identity authentication service; and
    responsive to receiving, from said external server, an authenticated callee identity of a callee utilizing said destination device, transferring said authenticated callee identity to an origin device to inform a caller initiating said call at said origin device of an identity of a party answering said call.

13. The system for informing a caller of a callee identity according to claim 12 wherein the brokering a connection between said destination device and an external server further comprises:
    transmitting a request for said callee identity authentication service via a signal gateway to a network for accessing said external server;
    responsive to receiving access to said callee identity authentication service, transferring a call to said external server;
    transferring a prompt for a voice utterance, received from said external server via a media gateway, to said destination device;
    transferring a voice utterance by said callee through said media gateway to said network for accessing said external server; and
    receiving said authenticated callee identity via said signal gateway at said trusted telephone network.

14. The system for informing a caller of a callee identity according to claim 12, wherein the computer memory also has disposed within it computer program instructions capable of:

filtering content of said authenticated callee identity before transfer to said origin device.

15. The system for informing a caller of a callee identity according to claim 12, wherein the computer memory also has disposed within it computer program instructions capable of:

filtering said authenticated callee identity to block at least a portion of the content of said authenticated callee identity.

16. The system for informing a caller of a callee identity according to claim 12, wherein the computer memory also has disposed within it computer program instructions capable of:

detecting a line number utilized to access said destination device; and transferring said line number with said authenticated callee identity to said origin device.

17. A computer program product for informing a caller of a callee identity, the computer program product disposed upon a non-transitory computer readable storage medium, the computer program product comprising computer program instructions for:

detecting a call receipt condition from a destination device at said trusted telephone network;

brokering a connection between said destination device and an external server enabled to perform a callee identity authentication service; and transferring an authenticated callee identity received from said external server to an origin device to inform a caller initiating said call at said origin device of an identity of a party answering said call.

18. The computer program product for informing a caller of a callee identity according to claim 17 wherein brokering a connection between said destination device and an external server further comprises:

transmitting a request for said callee identity authentication service via a signal gateway to a network for accessing said external server;

responsive to receiving access to said callee identity authentication service, transferring a call to said external server;

transferring a prompt for a voice utterance, received from said external server via a media gateway, to said destination device;

transferring a voice utterance by said callee through said media gateway to said network for accessing said external server; and receiving said authenticated callee identity via said signal gateway at said trusted telephone network.

19. The computer program product for informing a caller of a callee identity according to claim 17, further comprising:

computer program instructions for filtering content of said authenticated callee identity before transfer to said origin device.

20. The computer program product for informing a caller of a callee identity according to claim 17, further comprising:

computer program instructions for filtering content of said authenticated callee identity according to filtering preferences associated with said authenticated callee identity.

\* \* \* \* \*